US011307350B2

(12) United States Patent
Li et al.

(10) Patent No.: US 11,307,350 B2
(45) Date of Patent: Apr. 19, 2022

(54) SINGLE MODE OPTICAL FIBER WITH LOW BEND LOSS AT SMALL AND LARGE BEND DIAMETERS (71) Applicant: CORNING INCORPORATED, Corning, NY (US)

(72) Inventors: Ming-Jun Li, Horseheads, NY (US); Snigdharaj Kumar Mishra, Wilmington, NC (US); Pushkar Tandon, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 16/944,485

(22) Filed: Jul. 31, 2020

(65) Prior Publication Data
US 2021/0041623 A1 Feb. 11, 2021

Related U.S. Application Data (60) Provisional application No. 62/883,946, filed on Aug. 7, 2019.

(51) Int. Cl.
G02B 6/036 (2006.01)
G02B 6/02 (2006.01)
(52) U.S. Cl.
CPC ..... G02B 6/03688 (2013.01); G02B 6/02071 (2013.01); G02B 6/02395 (2013.01)
(58) Field of Classification Search
CPC ............ G02B 6/03688; G02B 6/02071; G02B 6/02395; G02B 6/0365
See application file for complete search history.

(56) References Cited

U.S. PATENT DOCUMENTS

| | | | |
|---|---|---|---|
| 4,114,980 A | 9/1978 | Asam et al. | |
| 7,272,289 B2 | 9/2007 | Bickham et al. | |
| 7,587,111 B2 | 9/2009 | De Montmorillon et al. | |
| 7,899,293 B2 | 3/2011 | De Montmorillon et al. | |
| 7,995,889 B2 | 8/2011 | De Montmorillon et al. | |
| 8,107,784 B2 | 1/2012 | Borel et al. | |
| 8,145,025 B2 | 3/2012 | De Montmorillon et al. | |
| 8,428,411 B2 | 4/2013 | De Montmorillon et al. | |
| 8,428,414 B2 | 4/2013 | De Montmorillon et al. | |

(Continued)

FOREIGN PATENT DOCUMENTS

| | | |
|---|---|---|
| EP | 1785754 A1 | 5/2007 |
| EP | 2330447 A1 | 6/2011 |

OTHER PUBLICATIONS

International Search Report and Written Opinion of the International Searching Authority; PCT/US2020/042946; dated Oct. 26, 2020; 11 Pages; European Patent Office.

Primary Examiner — Ellen E Kim
(74) Attorney, Agent, or Firm — Kevin L. Bray (57) ABSTRACT The single mode optical fiber disclosed herein has a core, an inner cladding, a trench and an outer cladding, along with a non-glass protective coating. The refractive index profile of the optical fiber is such that the optical fiber has relatively low bend loss at both small and large bend diameters. The relative refractive indices of the inner cladding, trench and outer cladding are such that a tunneling point that arises during bending is pushed out beyond the trench and thus sufficiently far away from the core so that bending losses for both small and large radius bends are relatively small.

21 Claims, 6 Drawing Sheets

(56) References Cited

U.S. PATENT DOCUMENTS

| | | |
|---|---|---|
| 8,750,664 B2 | 6/2014 | Zhang et al. |
| 2008/0279515 A1 | 11/2008 | Bickham et al. |
| 2008/0279517 A1 | 11/2008 | Bickham et al. |
| 2012/0183268 A1 | 7/2012 | De et al. |
| 2014/0308015 A1 | 10/2014 | Bookbinder et al. |
| 2017/0031089 A1 | 2/2017 | De Montmorillon et al. |
| 2017/0307814 A1* | 10/2017 | Tachibana ............. C03C 25/475 |
| 2018/0026415 A1* | 1/2018 | Daniel .................. H01S 3/0405 372/6 |
| 2019/0227227 A1* | 7/2019 | Terruzzi .................. C03C 25/50 |
| 2020/0166700 A1* | 5/2020 | Steeman ............. C03C 25/1065 |

\* cited by examiner

SINGLE MODE OPTICAL FIBER WITH LOW BEND LOSS AT SMALL AND LARGE BEND DIAMETERS

This Application claims priority under 35 USC § 119(e) from U.S. Provisional Patent Application Ser. No. 62/883,946, filed on Aug. 7, 2019, and which is incorporated by reference herein in its entirety.

FIELD

The present disclosure relates to optical fibers, and in particular to single mode optical fibers with relatively low bend loss at both small and large bend diameters.

BACKGROUND

Optical fibers are used for a variety of optical telecommunications applications, including for Fiber-To-The-Home (FTTH) application. Optical fibers for FTTH applications must satisfy International Telecommunications Union (ITU) standards as presently set forth in ITU-T G.657.A2, which among other things sets forth requirements for single mode optical fibers with respect to mode field diameter (MFD) @ 1310 nm and bend loss performance for both small bend diameters (e.g. 15 mm and 20 mm) and large bend diameters (e.g. 30 mm, 60 mm).

As market trends continue towards optical fiber cables carrying higher counts of smaller diameter (e.g. 200 microns) optical fibers, new ITU-standards-compliant optical fibers having mode field diameter and cutoff characteristics of standard single mode fiber but also having better bend performance at both small and large bend diameters that can occur within an optical fiber cable are needed.

SUMMARY

An embodiment of the disclosure is directed to an optical fiber, comprising: a) a glass core having a radius $r_1$ and a relative refractive index $\Delta_1$; b) a glass cladding immediately surrounding the core, the cladding comprising: 1) an inner cladding immediately surrounding the core and having a radius $r_2$ and a relative refractive index $\Delta_2$; 2) a trench immediately surrounding the inner cladding and having a radius $r_3$, relative refractive index $\Delta_3$ and a trench volume $V_3$ with a magnitude $|V_3|$; 3) an outer cladding immediately surrounding the trench and having a radius $r_4$, and a relative refractive index $\Delta_4$ and defining a fiber diameter $DF=2r_4$; and c) wherein: i) $\Delta_1 > \Delta_2 > \Delta_4 > \Delta_3$; ii) $0.005\% \leq \Delta_2 - \Delta_4 \leq 0.05\%$; iii) $15 \ \mu m \leq r_2 \leq 25 \ \mu m$; iv) $30 \ \Delta\% \ \mu m^2 \leq |V_3| \leq 80 \ \Delta\% \ \mu m^2$; vi) a mode field diameter (MFD) at a wavelength of 1310 nm in the range $9.0 \ \mu m \leq MFD \leq 9.5 \ \mu m$; and vii) at a wavelength of 1550 nm: a bend loss $BL_{15} \leq 0.5$ dB/turn for a 15 mm bend diameter, a bend loss $BL_{20} \leq 0.2$ dB/turn for a 20 mm bend diameter, and a bend loss $BL_{30} \leq 0.005$ dB/turn for a 30 mm bend diameter.

The optical fiber described above can also comprise a combination of one or more of the following properties, to the extent the combination is self-consistent, as will be understood by one skilled in the art:

1) at the wavelength of 1310 nm, the MFD is in the range $9.0 \leq MFD \leq 9.3 \ \mu m$.
2) $0.01\% \leq \Delta_2 - \Delta_4 \leq 0.05\%$.
3) $0.01\% \leq \Delta_2 - \Delta_4 \leq 0.04\%$.
4) $BL_{30} \leq 0.003$ dB/turn.
5) $BL_{15} \leq 0.1$ dB/turn, $BL_{20} \leq 0.05$ dB/turn and $BL_{30} \leq 0.003$ dB/turn.
6) a cable cutoff wavelength $\lambda_{CC} < 1260$ nm.
7) a zero dispersion wavelength $\lambda_0$ between 1300 nm and 1324 nm.
8) $50 \ \Delta\% \cdot \mu m^2 \leq |V_3| \leq 70 \ \Delta\% \cdot \mu m^2$.
9) $2 \ \Delta\% \cdot \mu m^2 \leq V_2 \leq 15 \ \Delta\% \cdot \mu m^2$.
10) a ratio of $r_1/r_2$ in the range $0.15 \leq r_1/r_2 \leq 0.4$.
11) a MAC number in the range between 7.0 and 8.5.
12) a 2 meter fiber cutoff wavelength $\lambda_{FC}$ and a 22 meter cable cutoff wavelength $\lambda_{CC}$, and wherein $\lambda_{FC} - \lambda_{CC} > 200$ nm.
13) the outer cladding comprises silica and the inner cladding comprises one or more updopants selected from the group of updopants comprising: germania, titania, phosphorus and chlorine.
14) a non-glass protective coating on an outer surface of the outer cladding that defines a coating diameter $DC \leq 210$ microns.
15) wherein the non-glass protective coating mentioned immediately above comprises a primary coating having a first elastic modulus immediately adjacent the outer surface of the outer cladding, and a secondary coating having a second elastic modulus immediately adjacent the primary coating, wherein the in situ elastic modulus of the primary coating is less than 1 MPa and the elastic modulus of the secondary coating is greater than 1200 MPa.
16) the non-glass protective coating mentioned immediately above comprises an outermost ink layer having a thickness $TH_{ink}$ of less than 10 microns.
17) a fiber diameter DF<130 microns.
18) a fiber diameter DF<120 microns.
19) a fiber diameter DF<110 microns.
20) a wire mesh microbend loss $BL_{WM} < 0.03$ dB/km at 1550 nm.
21) wire mesh microbend loss $BL_{WM} < 0.01$ dB/km at 1550 nm.

Additional features and advantages are set forth in the Detailed Description that follows, and in part will be apparent to those skilled in the art from the description or recognized by practicing the embodiments as described in the written description and claims hereof, as well as the appended drawings. It is to be understood that both the foregoing general description and the following Detailed Description are merely exemplary, and are intended to provide an overview or framework to understand the nature and character of the claims.

BRIEF DESCRIPTION OF THE DRAWINGS

The accompanying drawings are included to provide a further understanding, and are incorporated in and constitute a part of this specification. The drawings illustrate one or more embodiment(s), and together with the Detailed Description explain the principles and operation of the various embodiments. As such, the disclosure will become more fully understood from the following Detailed Description, taken in conjunction with the accompanying Figures, in which.

DETAILED DESCRIPTION

Reference is now made in detail to various embodiments of the disclosure, examples of which are illustrated in the accompanying drawings. Whenever possible, the same or like reference numbers and symbols are used throughout the drawings to refer to the same or like parts. The drawings are not necessarily to scale, and one skilled in the art will recognize where the drawings have been simplified to illustrate the key aspects of the disclosure.

The claims as set forth below are incorporated into and constitute part of this Detailed Description.

Cartesian coordinates are shown in some of the Figures for the sake of reference and are not intended to be limiting as to direction or orientation.

The term "fiber" as used herein is shorthand for optical fiber.

The coordinate r is a radial coordinate, where r=0 corresponds to the centerline of the fiber.

The symbol "μm" is used as shorthand for "micron," which is a micrometer, i.e., $1 \times 10^{-6}$ meter.

The symbol "nm" is used as shorthand for "nanometer," which is $1 \times 10^{-9}$ meter.

The limits on any ranges cited herein are inclusive and thus lie within the range, unless otherwise specified.

The terms "comprising," and "comprises," e.g., "A comprises B," is intended to include as a special case the concept of "consisting," as in "A consists of B."

The "relative refractive index" as used herein is defined as:

$$\Delta \% = 100 \frac{n^2(r) - n_{cl}^2}{2n^2(r)}$$

where n(r) is the refractive index of the fiber at the radial distance r from the fiber's centreline AC (r=0) at a wavelength of 1550 nm, unless otherwise specified, and $n_{cl}$ is the index of the outer cladding at a wavelength of 1550 nm. When the outer cladding is essentially pure silica, $n_{cl}$=1.444 at a wavelength of 1550 nm. As used herein, the relative refractive index percent (also referred herein as the "relative refractive index" for short) is represented by Δ (or "delta"), Δ% (or "delta %"), or %, all of which can be used interchangeably, and its values are given in units of percent or %, unless otherwise specified. Relative refractive index is also expressed as Δ(r) or Δ(r) %. The relative refractive index is also defined for specific regions "i" of a fiber, where the regions "i" include a core (i=1), inner cladding (i=2), trench (i=3), and/or outer cladding (i=4). The relative refractive index of region "i" is expressed as $\Delta_i$, where, unless otherwise specified, $\Delta_i$ refers to the average value of Δ in region "i". The minimum and maximum values of Δ in region "i" are expressed as $\Delta_{iMIN}$ and $\Delta_{iMAX}$, respectively.

In cases where the refractive index of a region is less than the reference index $n_{cl}$, the relative refractive index is negative and the region is referred to as a depressed region or depressed-index region (also referred to as a "trench"), and the minimum relative refractive index is calculated at the point at which the relative refractive index is most negative unless otherwise specified. In cases where the refractive index of a region is greater than the reference index $n_{cl}$, the relative refractive index is positive and the region can be said to be raised or to have a positive index.

The "refractive index profile" is the relationship between refractive index or relative refractive index and radius. For relative refractive index profiles depicted herein as having step boundaries between adjacent core and/or cladding regions, normal variations in processing conditions may preclude obtaining sharp step boundaries at the interface of adjacent regions. It is to be understood that although boundaries of refractive index profiles may be depicted herein as step changes in refractive index, the boundaries in practice may be rounded or otherwise deviate from perfect step function characteristics. It is further understood that the value of the relative refractive index may vary with radial position within the core region and/or any of the cladding regions. When relative refractive index varies with radial position in a particular region of the fiber (e.g. core region and/or any of the cladding regions), it is expressed in terms of its actual or approximate functional dependence, or its value at a particular position within the region, or in terms of an average value applicable to the region as a whole. Unless otherwise specified, if the relative refractive index of a region (e.g. core region and/or any of the cladding regions) is expressed as a single value or as a parameter (e.g. %, Δ or Δ%) applicable to the region as a whole, it is understood that the relative refractive index in the region is constant, or approximately constant, and corresponds to the single value, or that the single value or parameter represents an average value of a non-constant relative refractive index dependence with radial position in the region. For example, if "i" is a region of the glass fiber, the parameter $\Delta_i$ refers to the average value of relative refractive index in the region, unless otherwise specified. Whether by design or a consequence of normal manufacturing variability, the dependence of relative refractive index on radial position may be sloped, curved, or otherwise non-constant.

The average relative refractive index ($\Delta_{ave}$) of a region of the fiber is determined from Eq. (2):

$$\Delta_{ave} = \int_{r_{inner}}^{r_{outer}} \frac{\Delta(r) dr}{(r_{outer} - r_{inner})}$$

where $r_{inner}$ is the inner radius of the region, $r_{outer}$ is the outer radius of the region, and Δ(r) is the relative refractive index of the region.

The optical fibers disclosed herein include a core region and a cladding region surrounding the core region. The core region and cladding region are glass. The cladding region includes multiple regions that differ in relative refractive index as described below. The multiple cladding regions are preferably concentric regions. The cladding region includes an inner cladding region, a depressed index cladding region, and an outer cladding region. The depressed index cladding region surrounds an inner cladding region. The depressed index cladding region is surrounded by an outer cladding region. The core region, inner cladding region, depressed index cladding region, and outer cladding region are also referred to as core, inner cladding, depressed index cladding, and outer cladding, respectively.

Whenever used herein, radial position $r_1$ and relative refractive index $\Delta_1$ or $\Delta_1(r)$ refer to the core region, radial position $r_2$ and relative refractive index $\Delta_2$ or $\Delta_2(r)$ refer to the inner cladding region, radial position $r_3$ and relative refractive index $\Delta_3$ or $\Delta_3(r)$ refer to the depressed index cladding region, radial position $r_4$ and relative refractive index $\Delta_4$ or $\Delta_4(r)$ refer to the outer cladding region, It is understood that the core region is substantially cylindrical in shape and that a surrounding inner cladding region, a surrounding depressed index cladding region, and a surrounding outer cladding region are substantially annular in shape. Annular regions are characterized in terms of an inner radius and an outer radius. Radial positions $r_1$, $r_2$, $r_3$, and $r_4$ refer herein to the outermost radii of the core, inner cladding, depressed index cladding, and outer cladding, respectively.

When two regions are directly adjacent to each other, the outer radius of the inner of the two regions coincides with the inner radius of the outer of the two regions. In one embodiment, for example, the fiber includes a depressed index cladding region surrounded by and directly adjacent to an outer cladding region. In such an embodiment, the radius $r_3$ corresponds to the outer radius of the depressed index cladding region and the inner radius of the outer cladding region. When the relative refractive index profile includes a depressed index cladding region surrounding and directly adjacent to an inner cladding region, the radial position $r_2$ corresponds to the outer radius of the inner cladding region and the inner radius of the depressed index cladding region. When the relative refractive index profile includes a depressed index cladding region surrounding and directly adjacent to the core, the radial position $r_1$ corresponds to the outer radius of the core and the inner radius of the depressed index cladding region. In the discussion below, the term "immediately surrounds" means "surrounding and directly adjacent to".

The difference between radial position $r_2$ and radial position $r_1$ is referred to herein as the thickness of the inner cladding region. The difference between radial position $r_3$ and radial position $r_2$ is referred to herein as the thickness of the depressed index cladding region. The difference between radial position $r_4$ and radial position $r_3$ is referred to herein as the thickness of the outer cladding region.

The term "dopant" as used herein refers to a substance that changes the relative refractive index of glass relative to pure undoped silica glass ($SiO_2$ glass). Updopants are dopants that increase the refractive index of the glass relative to pure undoped silica glass. Downdopants are dopants that decrease the refractive index of the glass relative to pure undoped silica glass. Updopants include Cl, Br, Ge, Al, P, Ti, Zr, Nb, and Ta, and downdopants include F and B. Regions of constant refractive index may be formed by not doping or by doping at a uniform concentration over the thickness of the region. Regions of variable refractive index are formed through non-uniform spatial distributions of dopants over the thickness of a region and/or through incorporation of different dopants in different regions. One or more other substances that are not dopants may be present in a region of an optical fiber (e.g., the core) having a positive relative refractive index $\Delta$ or a region of an optical fiber (e.g. the trench) having a negative relative refractive index $\Delta$. Updopants used to form the core of the optical fiber disclosed herein include $GeO_2$ (germania) and $Al_2O_3$ (alumina). Downdopants used to form the trench of the optical fiber disclosed herein include F (fluorine) and B (boron).

The parameter $\alpha$ (also called the "profile parameter" or "alpha parameter") as used herein relates to the relative refractive $\Delta(\%)$ where r is the radius (radial coordinate), and which is defined by:

$$\Delta(r) = \Delta_0 \left[ 1 - \left[ \frac{r - r_m}{(r_0 - r_m)} \right]^\alpha \right]$$

where $r_m$ is the point where $\Delta(r)$ is the maximum $\Delta_0$, $r_0$ is the point at which $\Delta(r)=0$ and r is in the range $r_{initial}$ to $r_{final}$, where $\Delta(r)$ is defined above, $r_{initial}$ is the initial point of the $\alpha$-profile, $r_{final}$ is the final point of the $\alpha$-profile and $\alpha$ is an exponent that is a real number. For a step index profile, $\alpha > 10$, and for a gradient-index profile, $\alpha < 5$.

The "trench volume" is denoted by $V_3$ and is defined for a fiber with a trench having a constant (or average) relative refractive index $\Delta_3$ and an outer cladding having a constant (or average) relative refractive index $\Delta_4$:

$$V_3 = (\Delta_4 - \Delta_3)[r_3^2 - r_2^2]$$

where $r_3$ and $r_2$, respectively, are the outer and inner radii that define the trench. In an example where the trench relative refractive index $\Delta_3$ varies with radial coordinate (i.e., $\Delta_3(r)$) and the outer cladding has a constant (or average) relative refractive index $\Delta_4$, the trench volume $V_3$ is given by:

$$V_3 = 2 \int_{r_2}^{r_3} (\Delta_4 - \Delta_3(r)) r \, dr.$$

The units of the trench volume are in "%-$\mu m^2$" or, equivalently "$\Delta$%-$\mu m^2$". The magnitude of the trench volume is denoted $|V_3|$.

The "inner cladding volume" is denoted by $V_2$ and is defined for a fiber with an inner cladding having a constant (or average) relative refractive index $\Delta_2$ and an outer cladding having a constant (or average) relative refractive index $\Delta_4$:

$$V_2 = (\Delta_2 - \Delta_4)[r_2^2 - r_1^2]$$

In an example where the inner cladding volume relative refractive index $\Delta_2$ varies with radial coordinate (i.e., $\Delta_2(r)$) and the outer cladding has a constant (or average) relative refractive index $\Delta_4$, the inner cladding volume $V_3$ is given by:

$$V_2 = 2 \int_{r_1}^{r_2} (\Delta_2(r) - \Delta_4) r \, dr$$

The units of the inner cladding volume are in "%-$\mu m^2$" or, equivalently "$\Delta$%-$\mu m^2$".

The "mode field diameter" or "MFD" of an optical fiber is determined using the Peterman II method, which is the current international standard measurement technique for measuring the MFD of an optical fiber. The MFD is given by:

$$MFD = 2w$$

$$w = \left[ 2 \frac{\int_0^\infty (f(r))^2 r \, dr}{\int_0^\infty \left( \frac{df(r)}{dr} \right)^2 r \, dr} \right]^{1/2}$$

where $f(r)$ is the transverse component of the electric field distribution of the guided optical signal and r is radial position in the fiber. The MFD depends on the wavelength of the optical signal and is reported herein at a wavelength of 1310 nm.

The zero-dispersion wavelength is denoted $\lambda_0$ and is the wavelength where material dispersion and waveguide dispersion cancel each other. In silica-based optical fibers, the zero-dispersion wavelength is about 1300 nm, e.g., between 1300 nm and 1324 nm, depending on the dopants used to form the optical fiber.

The operating wavelength is denoted by $\lambda$ and is a wavelength at which the optical fiber can operate while supporting a single mode.

The term "single mode" when referring to an optical fiber means that the optical fiber supports a single linear polarization mode $LP_{01}$ at the operating wavelength.

The cut-off wavelength is denoted $\lambda_C$ and is the minimum wavelength at which the optical fiber will support only one propagating mode. For wavelengths below the cutoff wavelength $\lambda_C$, multimode transmission may occur and an additional source of dispersion may arise to limit the fiber's information carrying capacity. The cutoff wavelength $\lambda_C$ can be a fiber cutoff wavelength or a cable cutoff wavelength. The fiber cutoff wavelength $\lambda_{CF}$ is based on a 2-meter fiber length while the cable cutoff wavelength $\lambda_{CC}$ is based on a 22-meter cabled fiber length as specified in TIA-455-80: FOTP-80 IEC-60793-1-44 Optical Fibres—Part 1-44: Measurement Methods and Test Procedures—Cut-off Wavelength (21 May 2003), by Telecommunications Industry Association (TIA).

For the fiber cutoff wavelength measurement, a 2-meter fiber is deployed in a single turn of constant radius of 140 mm. For the cable cutoff wavelength measurement, a 22-meter fiber is coiled into a loop with a minimum radius of 140 mm to conservatively simulate cabling effects. To simulate the effects of a cabled fiber and a splice organizer, two loops of 80 mm diameter are applied near one end. The 22-meter cable cutoff wavelength $\lambda_{CC}$ is typically less than the 2-meter cutoff wavelength $\lambda_{CF}$ due to higher levels of bending and mechanical pressure in the cable environment. Thus, the operating wavelength $\lambda$ has a lower limit in the cable environment ($\lambda_{CC}$) than in the fiber ($\lambda_{CF}$).

The MAC number is the ratio of the MFD to the cable cutoff wavelength $\lambda_{CC}$ in common units. For example, a MAC number for an MFD of 9 microns and a cable cut-off wavelength $\lambda_{CC}$ of 1260 nm (or 1.260 microns) is MAC=9/1.260=7.14.

The bend loss measured using a mandrel of a given diameter is denoted by "$BL_{DM}$," where "DM" is the diameter in mm of the mandrel used to assess bending performance. The diameter DM is also referred to herein as "bend diameter". The bend loss has units of dB/turn. The bending performance as discussed herein is macrobend performance and is gauged by measuring the induced attenuation increase in a mandrel wrap test unless otherwise noted. In the mandrel wrap test as specified in TIA-455-62: FOTP-62 IEC-60793-1-47 Optical Fibres—Part 1-47: Measurement Methods and Test Procedures—Macrobending Loss, by Telecommunications Industry Association (TIA), the small diameter fiber is wrapped one or more times around a cylindrical mandrel of diameter DM (e.g., 10 mm, or 15 mm, etc.), and the increase in attenuation at a specified wavelength due to the bending is determined. Attenuation in the mandrel wrap test is expressed in units of dB/turn, where one turn refers to one revolution of the optical fiber about the mandrel. Bend loss values for mandrel diameters of 15 mm, 20 mm and 30 mm, i.e., for $BL_{15}$, $BL_{20}$ and $BL_{30}$, are provided below for example optical fibers formed using the methods disclosed herein.

The bend loss $BL_{WM}$ is also reported, wherein $BL_{WM}$ stands for the bend loss as measured using the standard wire mesh bend loss test known in the art and is referred to as the "wire mesh microbend loss."

Optical Fiber

Figure 1A:
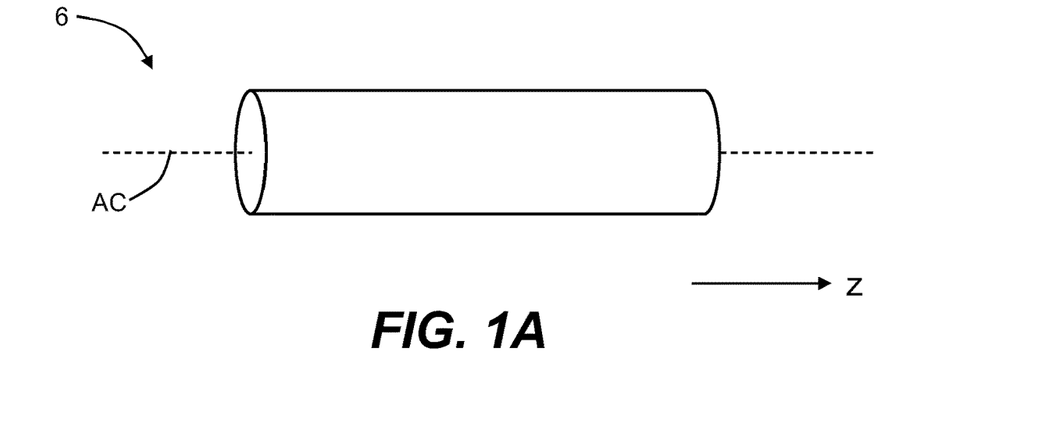
FIG. 1A is a schematic elevated view of a section of an example of the optical fiber disclosed herein.
Figure 1B:
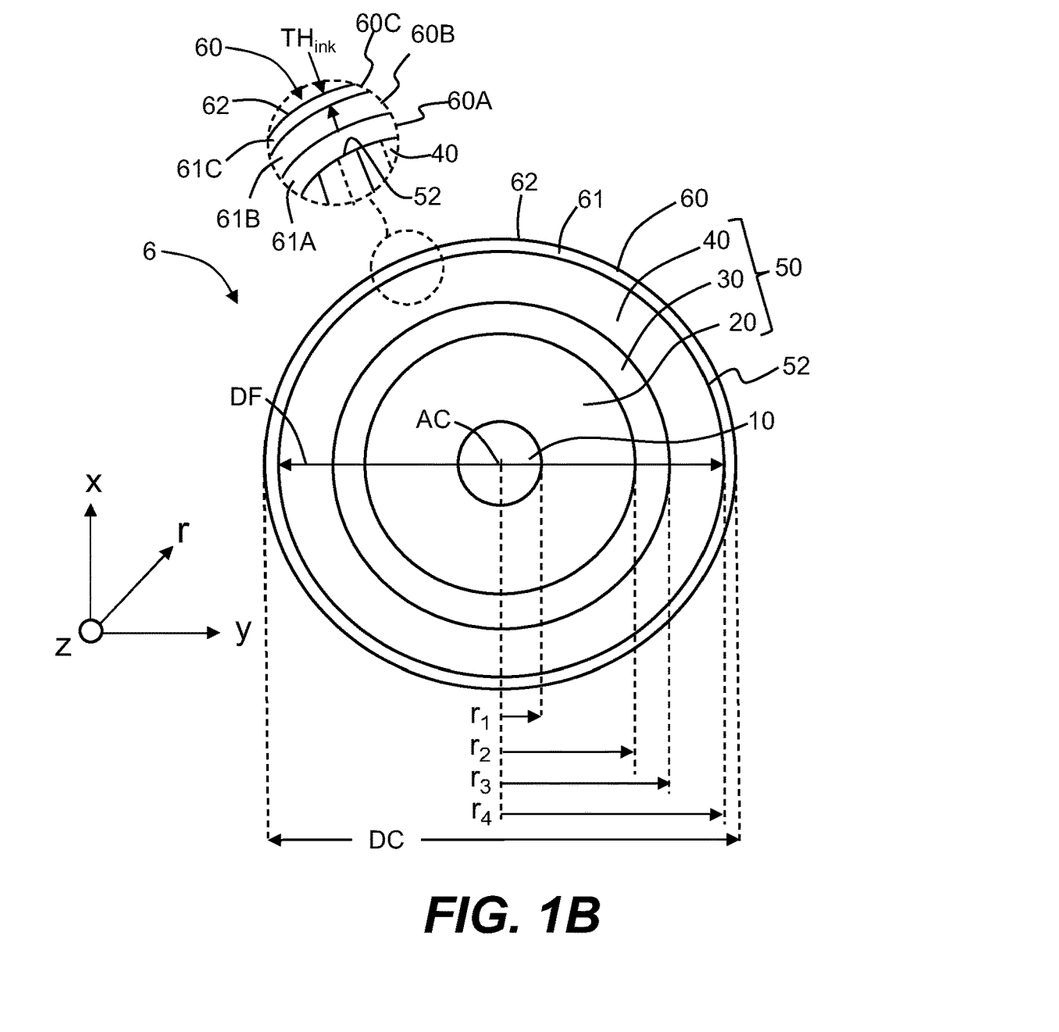
FIG. 1B is an x-y cross-sectional view of the example optical fiber of FIG. 1A.
Figure 2A:
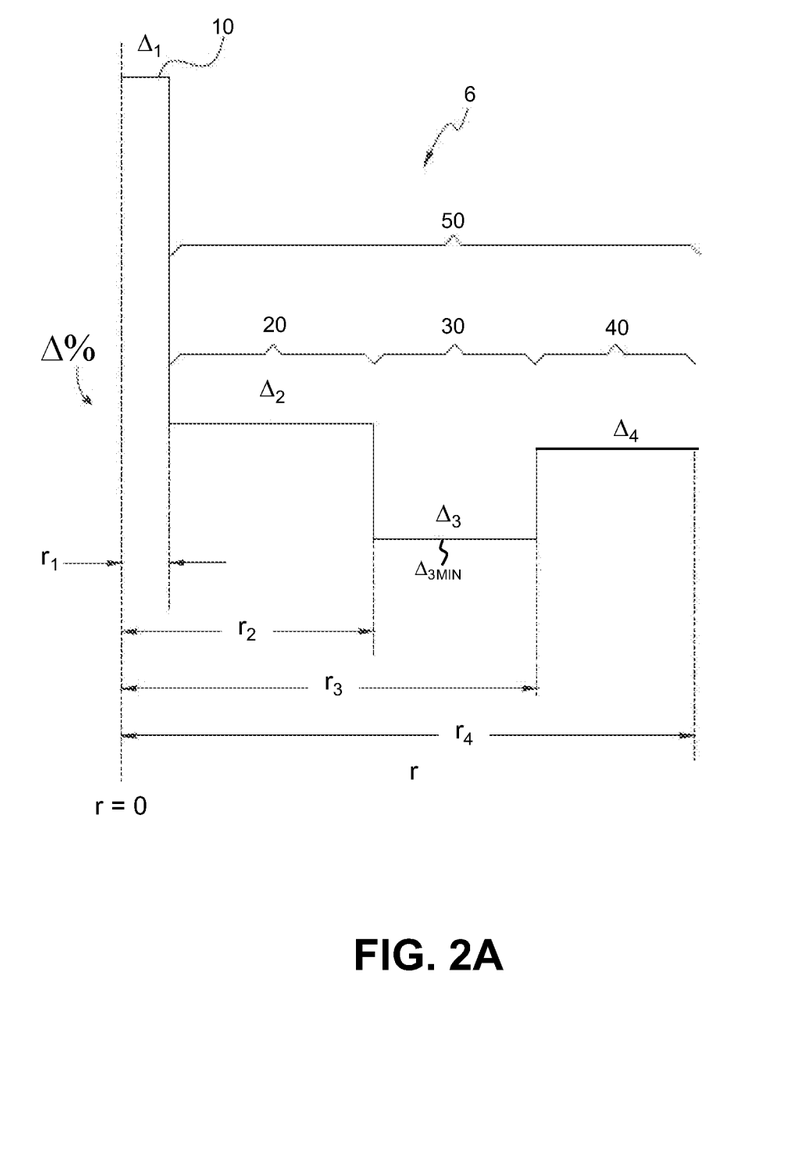
FIGS. 2A and 2B are example refractive index profile of the optical fiber as represented by a plot of the relative refractive index $\Delta\%$ (r) versus the radial coordinate r.
Figure 2B:
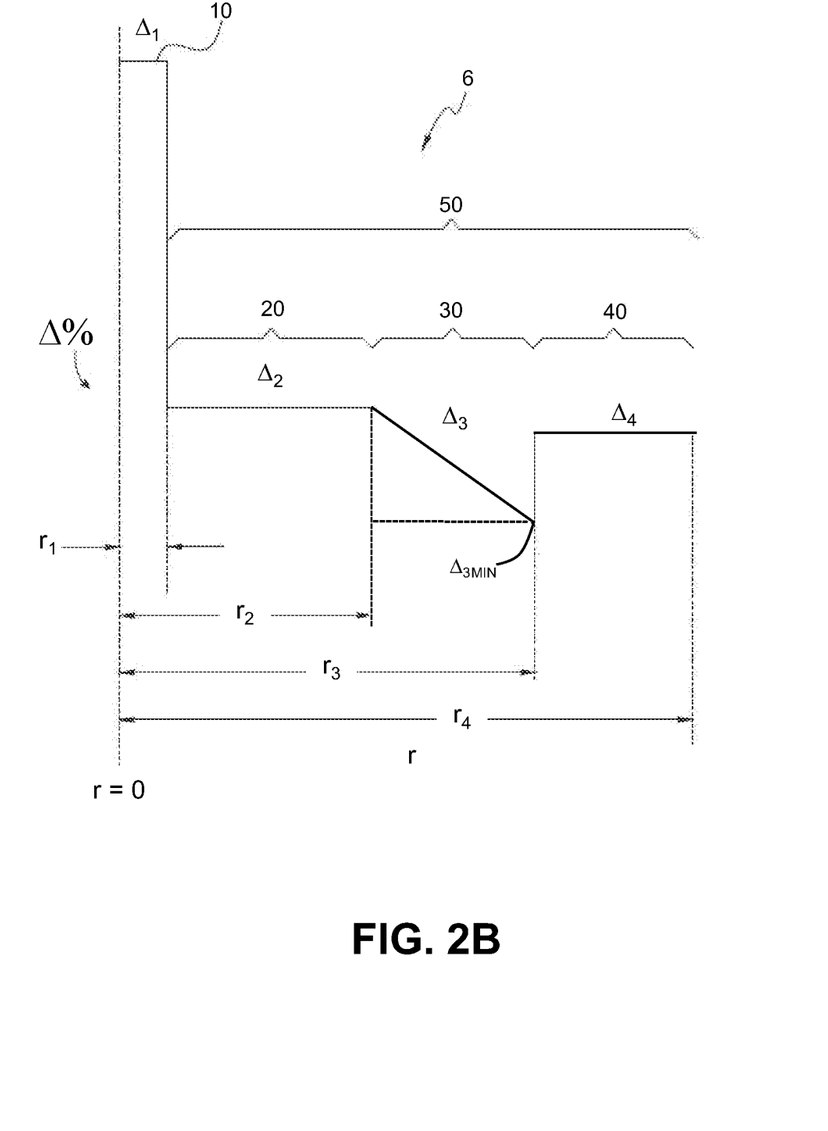

FIG. 1A is a schematic elevated view of a section of an example optical fiber ("fiber") 6 disclosed herein. FIG. 1B is an x-y cross-sectional view of the fiber 6, while FIGS. 2A and 2B are example refractive index profile of the fiber in the form of a plot of the relative refractive index Δ% (r) versus the radial coordinate r. The fiber 6 is single mode and is configured to have an MFD>9.0 μm at 1310 nm and a low bending loss at both small and large bend diameters as explained below, and in one example 9.0 μm<MFD<9.7 μm.

The fiber 6 has a centerline AC shown by way of example as running in the z-direction. The fiber 6 comprises a glass core region ("core") 10 that is centered on the centerline AC and that has a radial extent $r_1$ and a relative refractive index $\Delta_1$, with a maximum value $\Delta_{1MAX}$ preferably on the centerline AC (i.e., at r=0).

The core 10 is immediately surrounded by a glass cladding region ("cladding") 50 that extends from the core radius $r_1$ out to a cladding outer radius $r_4$. The cladding 50 includes an inner cladding region ("inner cladding") 20 closest to the core and extending from the core radius $r_1$ to a radius $r_2$ and having a relative refractive index $\Delta_2 < \Delta_1$; an intermediate cladding region or "trench" 30 immediately adjacent the inner cladding 20 and extending from the radius $r_2$ to a radius $r_3$ and having a relative refractive index $\Delta_3 < \Delta_2$; and an outer cladding region ("outer cladding") 40 immediately adjacent the trench 30 and extending from the radius $r_3$ to the outer cladding radius $r_4$ and having a relative refractive index $\Delta_4$, wherein $\Delta_3 < \Delta_4 < \Delta_2$. The trench 30 has a minimum relative refractive index $\Delta_{3MIN}$.

In an example, the cladding 50 has an outer surface 52 and fiber 6 includes a protective coating 60. In an example, the protective coating 60 can be made of a non-glass material 61, such as a polymeric material or a UV curable acrylate. In an example, the protective coating 60 can comprise a primary coating 60A immediately adjacent the outer surface 52 and a secondary coating 60B immediately adjacent the primary coating 60A (see close-up inset of FIG. 1B). In an example, the primary and secondary coatings 60A and 60B are made of respective materials 61A and 61B having different (in situ) elastic moduli, e.g., the primary coating has an elastic modulus of less than 1 MPa and the secondary coating has an elastic modulus of larger than 1200 MPa. In another example, the protective coating 60 can include an outermost ink layer 60C made of an ink material (ink) 61C. The ink layer 60C has a thickness $TH_{ink}$. In an example, the thickness $TH_{ink}$<10 microns. In an example, the ink material 61C that makes up the ink layer 60C is colored and the resulting fiber 6 is color coded.

When the fiber 6 includes the protective coating 60, it is referred to as a coated fiber and has an overall diameter DC and an outermost surface 62, as shown in FIG. 1B. An example coated fiber diameter DC is less than 210 microns. Without the protective coating 60, the fiber 6 is referred to as a bare fiber.

The fiber 6 can be formed using standard optical fiber drawing processes such as the example optical fiber drawing process forth below. In an example, the outer cladding 40 comprises undoped silica glass and the inner cladding 20 comprises silica glass with one or more updopants selected from the group of updopants comprising: germania, titania, phosphorus and chlorine, while the trench 30 comprises a downdopant such as F. In some embodiments, the inner cladding 20 is undoped silica glass, and the trench 30 and outer cladding 40 are silica glass down doped with F.

FIG. 2A is a plot of the relative refractive index Δ% versus radius r (μm) illustrating an example relative refractive index profile ("profile") of the fiber 6 as disclosed herein. The example profile has an inner cladding relative refractive index $\Delta_2$ larger than the outer cladding relative refractive index $\Delta_2$, a trench 30 having a relative refractive index $\Delta_3$ and a trench volume $V_3$ with a magnitude $|V_3|$ between 30 Δ%-μm$^2$ and 80 Δ%-μm$^2$, and wherein 0.01%≤$\Delta_2$−$\Delta_4$≤0.05%. In some embodiments the trench 30 has a triangular shape, as illustrated in FIG. 2B, wherein $\Delta_{3MIN}$ is located substantially at radius $r_3$.

Figure 3A:
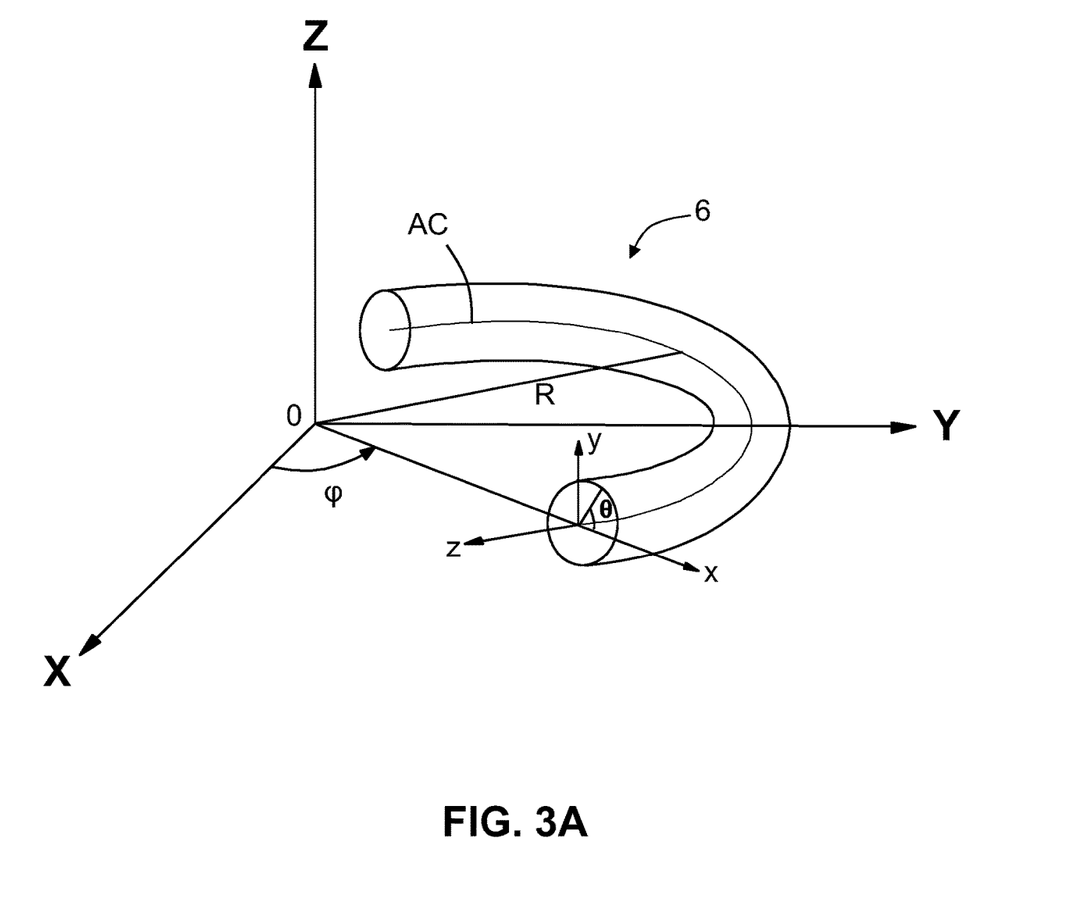
FIG. 3A is a schematic diagram of a section of an optical fiber with a bend of radius R as measured to the optical fiber centerline, with general coordinates (X, Y, Z) and general azimuthal angle φ, and local fiber coordinates (x, y, z) and local polar angle θ.

In the profiles shown in FIG. 2A and FIG. 2B, the trench 30 helps to reduce the bending loss at small bend diameters such as 20 mm, 25 mm. For a fiber 6 under bending as shown in FIG. 3A, the refractive index profile can be represented by a modified or "tilted" refractive index profile $n_T$ according to the relationship $$n_T(r, \theta) = \tilde{n}(r)\left(1 + \frac{2r}{R}\cos\theta\right)$$

where n(r) is the refractive index of the fiber as a function of radial position in an unbent state, $n_1$ is core refractive index, R is the bend radius (or half the bend diameter) and θ is the azimuthal angle in the local coordinate system (x,y,z) in the fiber cross section. The profile tilt depends on the angle θ. For θ=0 in the fiber bending plane, the profile tilt is maximal.

Figure 3B:
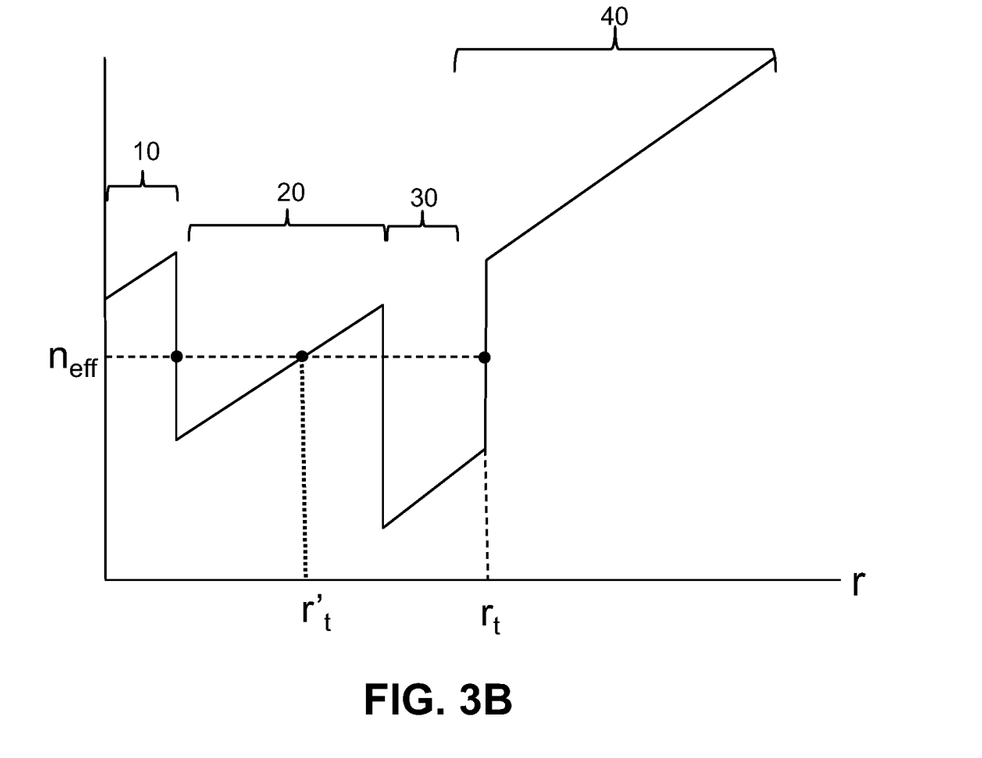
FIGS. 3B and 3C are plots of the effective refractive index ("effective index") $n_{eff}$ versus radial position r for two example optical fibers, depicting the effect of bending the optical fiber as a tilt in the effective index profile and also showing the tunneling points at which guided light can escape the optical fiber and cause loss.
Figure 3C:
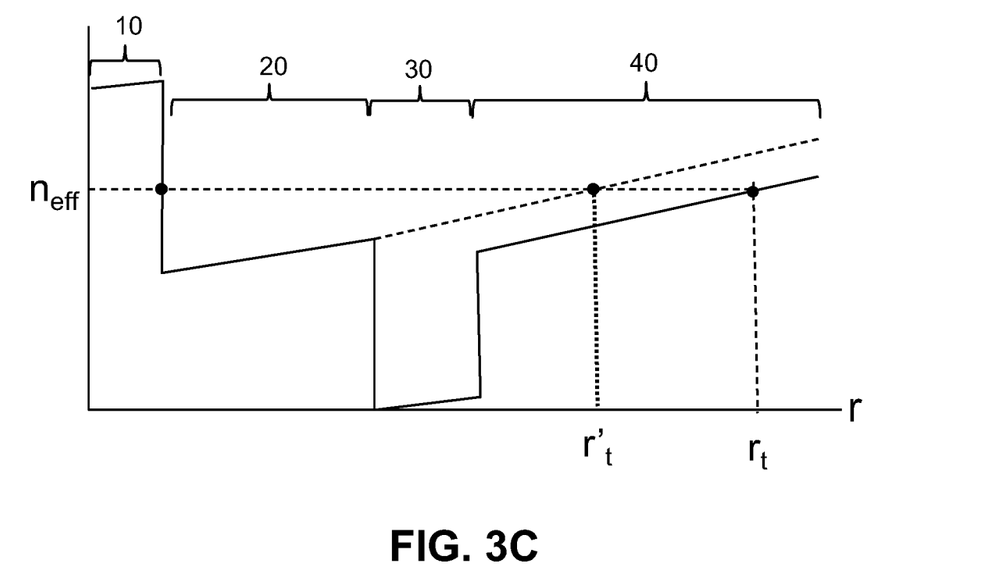

FIGS. 3B and 3C are plots of the refractive index versus radial coordinate r for a fiber in a bent state along the angular direction of θ=0 and are examples of tilted refractive index profiles $n_T$. The effective index $n_{eff}$ is defined as the equivalent refractive index for a guided mode in a fiber having a core and cladding as if traveled in a uniform medium with refractive index of $n_{eff}$. For a bend fiber as shown in FIGS. 3B and 3C, the refractive index in the cladding increases with the radius, which causes tunneling loss of the guided mode. When the effective index $n_{eff}$ for the guided mode equals the refractive index in the cladding 50 at a radius of r=$r_t$, guided light (fundamental and higher order modes) that travels mainly in the core 10 starts to tunnel out of the core, causing bending loss. The degree of tilt of the refractive index profile depends on the bend diameter 2R per the above equation, with the tilt increasing with decreasing bend diameter. The radial position at which the light tunneling occurs is referred to as the "tunneling point" and is denoted $r_t$.

The tunneling point depends on bend diameter. For an unbent fiber (infinite bend diameter), the tunneling point is far removed from the core, the guided (fundamental) mode is tightly confined in the core, and essentially no tunneling occurs. As bend diameter decreases, greater tilt occurs in the refractive index profile and the distance between the tunneling point and the core decreases. This leads to more tunneling and thus greater bend loss as the bend diameter decreases.

The position of the tunneling point relative to the core is influenced by the refractive index profile. Two features of the index profiles disclosed herein act to mitigate losses due to tunneling by inhibiting a reduction in the radial separation of the tunneling point $r_t$ and the core radius $r_1$. The trench is a first feature and an increase in the inner cladding refractive index relative to the outer cladding refractive index is a second feature. The first feature is particularly effective at inhibiting tunneling losses at small bend diameters (tight bends) and the second feature is particularly effective at inhibiting tunneling losses at large bend diameters (slight bends).

FIG. 3B represents the case of a relatively small bend radius. When the bend radius is small, the tunneling point is positioned in close proximity to the trench 30. The tunneling point $r_t$ in the schematic example of FIG. 3B is located at the outer trench radius $r_3$, i.e., $r_t$=$r_3$. If the fiber is not bent, the tunneling point is at the fiber glass and coating interface surface $r_t$=$r_4$, where the coating index is higher than the glass index. If the trench 30 were absent, the tunneling point would be closer to the core 10, e.g., at $r'_t$<$r_3$ as shown by the dotted line in FIG. 3B. When the tunneling point $r_t$ is closer to the core, more of the guided light within the core 10 tunnels out of the core 10 and into the cladding 50, causing higher bending loss. The low index trench 30 has the effect of maintaining a larger separation between the core and the tunneling point and is particularly effective in reducing the tunneling loss induced by bending at small bend diameters. However, for large bend diameters, such as shown in the effective index plot of FIG. 3C, the trench 30 does not help to substantially reduce the bending loss because the tunneling point $r_t$ is far removed from (i.e., at a significant radial separation from) the trench 30.

To reduce the amount of bending loss at relatively large bend diameters, the outer cladding region 40 of the present fibers has been configured to have a slightly lower relative refractive index than the inner cladding region 20, i.e., $\Delta_4$<$\Delta_2$, as shown in FIGS. 2A and 2B. This feature of the relative refractive index profile shifts the tunneling point from $r'_t$ to $r_t$, as shown in FIG. 3C, thus promoting a larger radial separation of the tunneling point from the core. This helps to reduce the bending loss at large bend diameters such as 30 mm, 40 mm, 50 mm and 60 mm. In addition, by configuring the relative refractive index $\Delta_2$ of the inner cladding region 20 to be only slightly higher than the relative refractive index $\Delta_4$ of the outer cladding region 40, tunneling of higher order modes into the inner cladding region 20 persists, which serves to lower the fiber and cable cutoff wavelengths $\lambda_{CF}$ and $\lambda_{CC}$. That is, the tunneling efficiency of different modes depends on the difference $\Delta_2$−$\Delta_4$. A small difference $\Delta_2$−$\Delta_4$ is effective to substantially inhibit tunneling of the fundamental mode while permitting tunneling of higher order modes, thus leading to a reduction in the fiber and cable cutoff wavelengths $\lambda_{CF}$ and $\lambda_{CC}$. In one embodiment, the cable cutoff wavelength $\lambda_{CC}$ is reduced relative to the fiber cutoff wavelength $\lambda_{CF}$ such that the difference $\lambda_{FC}$−$\lambda_{CC}$>100 nm, or $\lambda_{FC}$−$\lambda_{CC}$>150 nm, or $\lambda_{FC}$−$\lambda_{CC}$>200 nm, or $\lambda_{FC}$−$\lambda_{CC}$>250 nm, or in the range from 400 nm>$\lambda_{FC}$−$\lambda_{CC}$>100 nm, or 300 nm>$\lambda_{FC}$−$\lambda_{CC}$>150 nm.

The relative refractive profiles disclosed herein provide optical fibers with bend performance compliant with the G.657.A2 standard at both small bend diameters (15 mm, 20 mm) and large bend diameters (30 mm, 40 mm, 50 mm, 60 mm). Also, the new profiles designs have MFD larger than 9.0 μm that are suitable for low splicing and connector losses with standard SMF (single mode fiber). For the higher-index inner cladding region to be effective in tunneling essentially only higher order modes at large bend diameters, it has been found that the radius $r_2$ satisfies the condition 17 μm≤$r_2$≤25 μm and the difference in the relative refractive indices of the inner cladding region 20 and the outer cladding region 40 satisfies the condition 0.01%≤$\Delta_2$−$\Delta_4$≤0.05% or 0.005%≤$\Delta_2$−$\Delta_4$≤0.05% or 0.01%≤$\Delta_2$−$\Delta_4$≤0.04%.

The Table below sets forth example parameters and their values for three example fibers 6, denoted in the Table as Ex1, Ex2 and Ex3. The parameters define the optical properties of the fiber 6.

| PARAMETER | Ex 1 | Ex 2 | Ex3 |
|---|---|---|---|
| $\Delta_{1MAX}$ | 0.35 | 0.35 | 0.35 |
| $r_1$ (μm) | 4.4 | 4.06 | 4.06 |
| Core alpha, α | 12 | 12 | 12 |
| $\Delta_2$ | 0.025 | 0.025 | 0.025 |
| $r_2$ (μm) | 17.6 | 19.26 | 19.05 |
| $V_2$ (Δ% · μm$^2$) | 7.26 | 8.86 | 8.66 |
| $\Delta_3$ | −0.4 | −0.4 | −0.4 |
| $r_3$ (μm) | 20.24 | 21.8 | 22.1 |
| $\Delta_4$ | 0 | 0 | 0 |
| $R_4$ (μm) | 62.5 | 62.5 | 62.5 |
| $|V_3|$ (Δ% · μm$^2$) | 39.96 | 41.72 | 50.20 |
| MFD @ 1310 nm (μm) | 9.16 | 9.08 | 9.06 |
| MAC # | 7.35 | 7.55 | 7.46 |
| $\lambda_{CC}$ (nm) | 1246 | 1203 | 1214 |
| $BL_{15}$ @ 1550 nm, DM = 15 mm (dB/turn) | 0.105 | 0.13 | 0.077 |
| $BL_{20}$ @ 1550 nm, DM = 20 mm (dB/turn) | 0.023 | 0.029 | 0.018 |
| $BL_{30}$ @ 1550 nm, DM = 30 mm (dB/turn) | 0.0015 | 0.002 | 0.0018 |

In an example, the fiber 6 disclosed herein has some, most or all of the following properties (parameters) (at 1310 nm unless otherwise noted), to the extent the set (combination) of properties is self-consistent:

1) $\Delta_1 > \Delta_2 > \Delta_4 > \Delta_3$.
2) $0.005\% \leq \Delta_2 - \Delta_4 \leq 0.05\%$ or $0.01\% \leq \Delta_2 - \Delta_4 \leq 0.05\%$ or $0.01\% \leq \Delta_2 - \Delta_4 \leq 0.04\%$.
3) 15 μm ≤ $r_2$ ≤ 25 μm.
4) A ratio $r_1/r_2$ in the range $0.15 \leq r_1/r_2 \leq 0.4$.
5) A trench volume $V_3$ with a magnitude $|V_3|$ in the range 30 Δ%·μm$^2$ ≤ $|V_3|$ ≤ 80 Δ%·μm$^2$ or 50 μm$^2$ ≤ $|V_3|$ ≤ 70 Δ%·μm$^2$.
6) An inner cladding volume $V_2$ in the range 2 Δ%·μm$^2$ ≤ $V_2$ ≤ 15 Δ%·μm$^2$ or 5 Δ%·μm$^2$ ≤ $V_2$ ≤ 12 Δ%·μm$^2$.
7) A MFD in the range 9.0 μm ≤ MFD ≤ 9.5 μm or 9.0 μm < MFD ≤ 9.3 μm or 9.0 μm < MFD ≤ 9.2 μm.
8) DC<210 μm or 200 μm ≤ DC ≤ 210 μm or DC<210 μm.
9) DF>130 μm or DF>120 μm or DF>110 μm.
10) A cable cutoff wavelength $\lambda_{CC} < 1260$ nm.
11) The difference between the fiber and cable cutoff wavelengths $\lambda_{FC}$ and $\lambda_{CC}$ satisfies the condition $\lambda_{FC} - \lambda_{CC} > 200$ nm.
12) a MAC number in the range between 7.0 and 8.5, or between 7.3 and 8.2.
13) A zero dispersion wavelength $\lambda_0$ between 1300 nm and 1324 nm.
14) Bend losses at 1550 nm as follows:
   a) a bend loss $BL_{15} \leq 0.5$ dB/turn for 15 mm bend diameter, a bend loss $BL_{20} \leq 0.2$ dB/turn for 20 mm bend diameter, and/or a bend loss $BL_{30} \leq 0.005$ dB/turn for 30 mm bend diameter.
   b) a bend loss $BL_{15} \leq 0.1$ dB/turn, a bend loss $BL_{20} \leq 0.05$ dB/turn and/or the bend loss $BL_{30} \leq 0.003$ dB/turn.
   c) A wiremesh microbend loss $BL_{WM} < 0.03$ dB/km or $BL_{WM} < 0.01$ dB/km using the standard wiremesh drum microbend test known in the art.

In some embodiments, the core alpha parameter (α) defining the core relative refractive index profile is larger than 5 or larger than 10 or larger than 20.

In an example, the fiber 6 disclosed herein has the following optical properties:
i) ITU-T G.652 compliant and ITU-T G657 compliant.
ii) An MFD in the range from 9.0 microns to 9.5 microns, more preferably 9.0 microns to 9.3 microns, which is substantially matched to the MFD of a standard single mode fiber, such as Corning SMF28® Ultra optical fiber.
iii) Excellent bend performance at small and large bend diameters per ITU-T G657.
iv) Excellent microbending
v) Enable small diameter coated fibers 6 (DC <210 microns) and small diameter cables.
vi) Enable improved performance high density cables.

Forming the Fiber Using a Drawing Process

Figure 4:
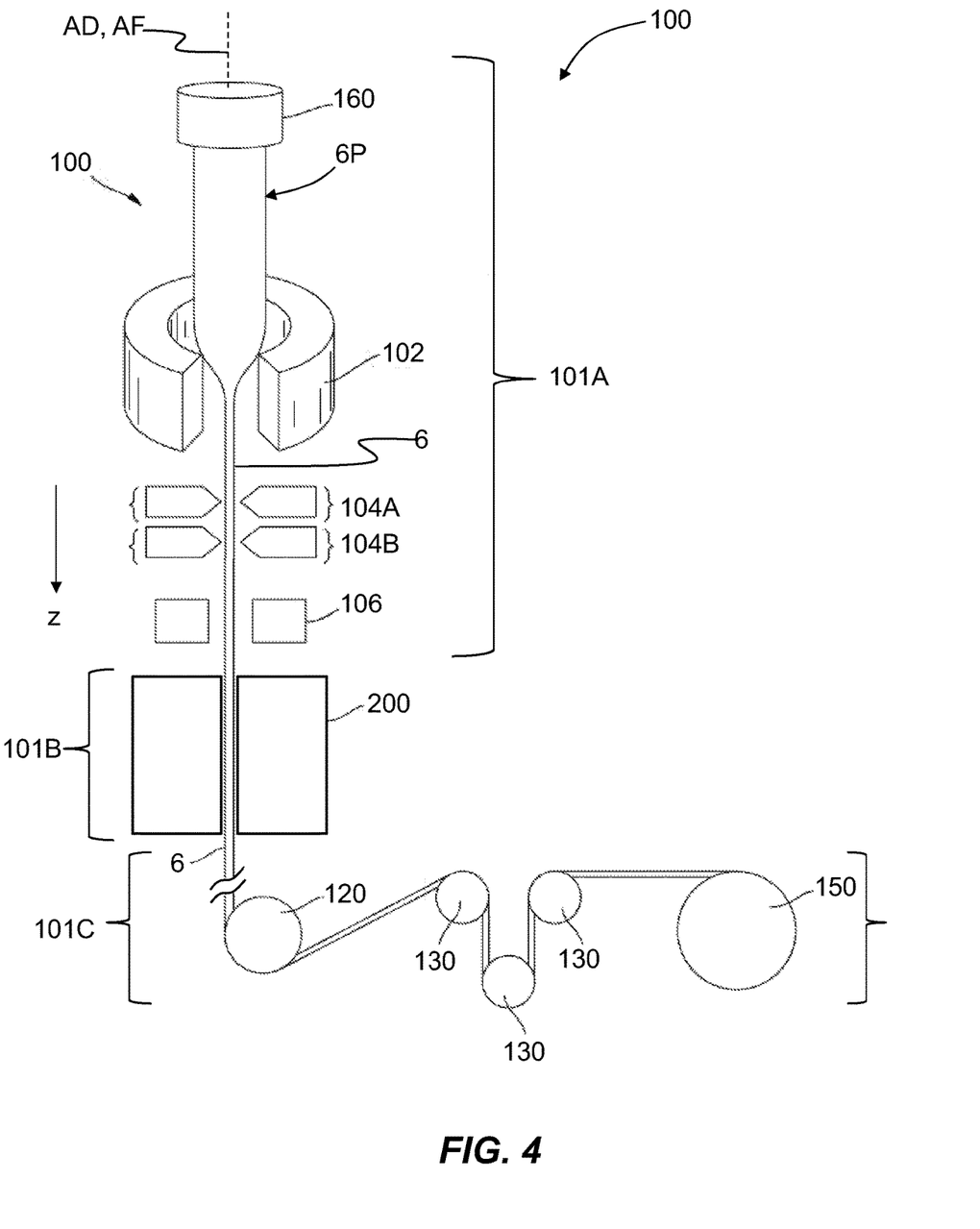
FIG. 4 is a schematic diagram of an optical fiber drawing system used to form the optical fiber disclosed herein.

FIG. 4 is a schematic diagram of an example optical fiber drawing system ("drawing system") 100 used to fabricate the fiber 6 disclosed herein. The drawing system 100 comprises three main sections: a bare-fiber-forming ("bare fiber") section 101A, a coating section 101B downstream of the bare fiber section 101A, and a take-up section 101C downstream of the coating section 101B.

An example bare fiber section 101A of the drawing system 100 comprises a draw furnace 102 for heating an end of an optical fiber preform 6P to its glass melt temperature (e.g., to about 2000° C.). The drawing system 100 includes other components such as non-contact measurement sensors 104A and 104B for measuring the size of the bare fiber 6 upon drawing as it exits the draw furnace 102 for size (diameter) control, and a cooling station 106 to cool the bare fiber 6. The drawing system 100 also includes a preform holder 160 located adjacent the top side of the draw furnace 102 and that holds the preform 6P used to form the bare fiber 6 and the coated fiber 6.

The preform 6P is formed using techniques known in the art (e.g., outside vapor deposition). The preform 6P is formed to have the same profile as the drawn fiber but is substantially larger (e.g., 25× to 100×) than the drawn fiber 6.

The coating section 101B comprises a coating system 200 that coats the bare fiber 6 with one or more coatings (as described in more detail below) to form a coated fiber.

The take-up section 101C comprises a tensioner 120 to pull (draw) the fiber 6, guide wheels 130 to guide the drawn fiber, and a fiber take-up spool ("spool") 150 to store the drawn and now coated fiber.

In forming the fiber 6, the fiber preform 6P is heated at one end by the draw furnace 102 to form bare fiber 6, which exits the draw furnace 102 and travels along a draw axis AD. The bare fiber 6 also has a fiber axis AF that is coaxial with the draw axis AD. The tensioner 120 applies tension along the length of the fiber 6, i.e., in the z-direction to continue drawing the bare fiber 6 from the preform 6P. The dimensions (e.g., the diameter) of the bare fiber 6 are measured by the non-contact sensors 104A and 104B and the measured dimensions are used to control the draw process. The bare fiber 6 can then pass through the cooling mechanism 106, which can be filled with a gas that facilitates cooling at a controlled rate slower than air at ambient temperatures. The coating system 200 then applies one or more coatings to the bare fiber 6 to form the coated fiber 6.

The coated fiber 6 passes from the tensioner 120 to the guide wheels 130, then through the guide wheels to the spool 150, where the coated fiber 6 is taken up and stored. The configuration of the coated fiber and the various drawing parameters (draw speed, temperature, tension, cooling rate, etc.) dictate the final form of the coated fiber 6.

Aspect 1 of the description is:
An optical fiber, comprising:
a) a glass core having a radius $r_1$ and a relative refractive index $\Delta_1$;
b) a glass cladding immediately surrounding the core, the cladding comprising:
1. an inner cladding immediately surrounding the core and having a radius $r_2$ and a relative refractive index $\Delta_2$;
2. a trench immediately surrounding the inner cladding and having a radius $r_3$, relative refractive index $\Delta_3$ and a trench volume $V_3$ with a magnitude $|V_3|$; and
3. an outer cladding immediately surrounding the trench and having a radius $r_4$, and a relative refractive index $\Delta_4$ and defining a fiber diameter $DF=2r_4$; and
c) wherein:
i) $\Delta_1 > \Delta_2 > \Delta_4 > \Delta_3$;
ii) $0.005\% \leq \Delta_2 - \Delta_4 \leq 0.05\%$;
iii) $15 \ \mu m \leq r_2 \leq 25 \ \mu m$;
iv) $30 \ \Delta\% \cdot \mu m^2 \leq |V_3| \leq 80 \ \Delta\% \cdot \mu m^2$;
vi) a mode field diameter (MFD) at a wavelength of 1310 nm in the range $9.0 \ \mu m \leq MFD \leq 9.5 \ \mu m$; and
vii) at a wavelength of 1550 nm: a bend loss $BL_{15} \leq 0.5$ dB/turn for a 15 mm bend diameter, a bend loss $BL_{20} \leq 0.2$ dB/turn for a 20 mm bend diameter, and a bend loss $BL_{30} \leq 0.005$ dB/turn for a 30 mm bend diameter.

Aspect 2 of the description is:
The optical fiber according to Aspect 1, wherein at the wavelength of 1310 nm, the MFD is in the range $9.0 \ \mu m \leq MFD \leq 9.3 \ \mu m$.

Aspect 3 of the description is:
The optical fiber according to Aspect 1 or 2, wherein $0.01\% \leq \Delta_2 - \Delta_4 \leq 0.05\%$.

Aspect 4 of the description is:
The optical fiber according to Aspect 1 or 2, wherein $0.01\% \leq \Delta_2 - \Delta_4 \leq 0.04\%$.

Aspect 5 of the description is:
The optical fiber according to any of Aspects 1-4, wherein the bend loss $BL_{30} \leq 0.003$ dB/turn.

Aspect 6 of the description is:
The optical fiber according to any of Aspects 1-4, wherein the bend loss $BL_{15} \leq 0.1$ dB/turn, the bend loss $BL_{20} \leq 0.05$ dB/turn and the bend loss $BL_{30} \leq 0.003$ dB/turn.

Aspect 7 of the description is:
The optical fiber according to any of Aspects 1-6, further comprising a cable cutoff wavelength $\lambda_{CC} < 1260$ nm.

Aspect 8 of the description is:
The optical fiber according to any of Aspects 1-7, further comprising a zero dispersion wavelength $\lambda_0$ of the optical fiber is between 1300 nm and 1324 nm.

Aspect 9 of the description is:
The optical fiber according to any of Aspects 1-8, wherein $50 \ \Delta\% \cdot \mu m^2 \leq |V_3| \leq 70 \ \Delta\% \cdot \mu m^2$.

Aspect 10 of the description is:
The optical fiber according to any of Aspects 1-9, wherein $2 \ \Delta\% \cdot \mu m^2 \leq V_2 \leq 15 \ \Delta\% \mu m^2$.

Aspect 11 of the description is:
The optical fiber according to any of Aspects 1-10, wherein a ratio of $r_1/r_2$ is in the range $0.15 \leq r_1/r_2 \leq 0.4$.

Aspect 12 of the description is:
The optical fiber according to any of Aspects 1-11, wherein the optical fiber comprises a MAC number in the range between 7.0 and 8.5.

Aspect 13 of the description is:
The optical fiber according to any of Aspects 1-12, wherein the optical fiber comprises a 2 meter fiber cutoff wavelength $\lambda_{FC}$ and a 22 meter cable cutoff wavelength $\lambda_{CC}$, and wherein $\lambda_{FC} - \lambda_{CC} > 200$ nm.

Aspect 14 of the description is:
The optical fiber according to any of Aspects 1-13, wherein the outer cladding comprises silica and wherein the inner cladding comprises one or more updopants selected from the group of updopants comprising: germania, titania, phosphorus and chlorine.

Aspect 15 of the description is: The optical fiber according to any of Aspects 1-14, wherein the outer cladding comprises an outer surface further comprising a non-glass protective coating on the outer surface that defines a coating diameter $DC \leq 210$ microns.

Aspect 16 of the description is:
The optical fiber according to Aspect 15, wherein the non-glass protective coating comprises a primary coating having a first elastic modulus immediately adjacent the outer surface of the outer cladding, and a secondary coating having a second elastic modulus immediately adjacent the primary coating, wherein the in situ elastic modulus of the primary coating is less than 1 MPa and the elastic modulus of the secondary coating is greater than 1200 MPa.

Aspect 17 of the description is:
The optical fiber according to Aspect 15 or 16, wherein the non-glass protective coating comprises an outermost ink layer having a thickness $TH_{ink}$ of less than 10 microns.

Aspect 18 of the description is:
The optical fiber according to any of Aspects 1-17, wherein the fiber diameter DF <130 microns.

Aspect 19 of the description is:
The optical fiber according to Aspect 18, wherein fiber diameter DF <120 microns.

Aspect 20 of the description is:
The optical fiber according to Aspect 19, wherein the fiber DF <110 microns.

Aspect 21 of the description is:
The optical fiber according to any of Aspects 1-20, wherein the optical fiber has a wire mesh microbend loss $BL_{WM} < 0.03$ dB/km at 1550 nm.

Aspect 22 of the description is:
The optical fiber according to any of Aspects 1-20, wherein the wire mesh microbend loss $BL_{WM} < 0.01$ dB/km at 1550 nm.

It will be apparent to those skilled in the art that various modifications to the preferred embodiments of the disclosure as described herein can be made without departing from the spirit or scope of the disclosure as defined in the appended claims. Thus, the disclosure covers the modifications and variations provided they come within the scope of the appended claims and the equivalents thereto.

What is claimed is:
1. An optical fiber, comprising:
a) a glass core having a radius $r_1$ and a relative refractive index $\Delta_i$;
b) a glass cladding immediately surrounding the core, the cladding comprising:
1. an inner cladding immediately surrounding the core and having a radius $r_2$ and a relative refractive index $\Delta_2$;
2. a trench immediately surrounding the inner cladding and having a radius $r_3$, relative refractive index $\Delta_3$ and a trench volume $V_3$ with a magnitude $|V_3|$; and

3. an outer cladding immediately surrounding the trench and having a radius $r_4$, and a relative refractive index $\Delta_4$ and defining a fiber diameter $DF=2r_4$; and c) wherein:
   i) $\Delta_1 > \Delta_2 > \Delta_4 > \Delta_3$;
   ii) $0.005\% \leq \Delta_2 - \Delta_4 \leq 0.05\%$;
   iii) $15\ \mu m \leq r_2 \leq 25\ \mu m$;
   iv) $30\ \Delta\% \cdot \mu m^2 \leq |V_3| \leq 80\Delta\% \cdot \mu m^2$;
   vi) a mode field diameter (MFD) at a wavelength of 1310 nm in the range $9.0\ \mu m \leq MFD \leq 9.5\ \mu m$; and
   vii) at a wavelength of 1550 nm: a bend loss $BL_{15} \leq 0.5$ dB/turn for a 15 mm bend diameter, a bend loss $BL_{20} \leq 0.2$ dB/turn for a 20 mm bend diameter, and a bend loss $BL_{30} \leq 0.005$ dB/turn for a 30 mm bend diameter; and d) wherein:
the relative refractive index $\Delta_2$ has a minimum value $\Delta_{2MIN}$ greater than $\Delta_4$.

2. The optical fiber according to claim 1, wherein at the wavelength of 1310 nm, the MFD is in the range $9.0\ \mu m \leq MFD \leq 9.3\ \mu m$.

3. The optical fiber according to claim 1, wherein $0.01\% \leq \Delta_2 - \Delta_4 \leq 0.05\%$.

4. The optical fiber according to claim 1, wherein $0.01\% \leq \Delta_2 - \Delta_4 \leq 0.04\%$.

5. The optical fiber according to claim 1, wherein the bend loss $BL_{30} \leq 0.003$ dB/turn.

6. The optical fiber according to claim 1, wherein the bend loss $BL_{15} \leq 0.1$ dB/turn, the bend loss $BL_{20} \leq 0.05$ dB/turn and the bend loss $BL_{30} \leq 0.003$ dB/turn.

7. The optical fiber according to claim 1, further comprising a cable cutoff wavelength $\lambda_{CC} < 1260$ nm.

8. The optical fiber according to claim 1, wherein $50\Delta\% \cdot \mu m^2 \leq |V_3| \leq 70\Delta\% \cdot \mu m^2$.

9. The optical fiber according to claim 1, wherein $2\Delta\% \cdot \mu m^2 \leq V_2 \leq 15\ \Delta\% \cdot \mu m^2$.

10. The optical fiber according to claim 1, wherein a ratio of $r_1/r_2$ is in the range $0.15 \leq r_1/r_2 \leq 0.4$.

11. The optical fiber according to claim 1, wherein the optical fiber comprises a MAC number in the range between 7.0 and 8.5.

12. The optical fiber according to claim 1, wherein the optical fiber comprises a 2 meter fiber cutoff wavelength $\lambda_{Fc}$ and a 22 meter cable cutoff wavelength $\lambda_{CC}$, and wherein $\lambda_{Fc} - \lambda_{CC} > 200$ nm.

13. The optical fiber according to claim 1, wherein the outer cladding comprises silica and wherein the inner cladding comprises one or more updopants selected from the group of updopants comprising: germania, titania, phosphorus and chlorine.

14. The optical fiber according to claim 1, wherein the outer cladding comprises an outer surface further comprising a non-glass protective coating on the outer surface that defines a coating diameter $DC \leq 210$ microns.

15. The optical fiber according to claim 14, wherein the non-glass protective coating comprises a primary coating having a first elastic modulus immediately adjacent the outer surface of the outer cladding, and a secondary coating having a second elastic modulus immediately adjacent the primary coating, wherein the in situ elastic modulus of the primary coating is less than 1 MPa and the elastic modulus of the secondary coating is greater than 1200 MPa.

16. The optical fiber according to claim 14, wherein the non-glass protective coating comprises an outermost ink layer having a thickness $TH_{ink}$ of less than 10 microns.

17. The optical fiber according to claim 1, wherein fiber diameter $DF < 120$ microns.

18. The optical fiber according to claim 17, wherein the fiber $DF < 110$ microns.

19. The optical fiber according to claim 1, wherein the optical fiber has a wire mesh microbend loss $BL_{WM} < 0.03$ dB/km at 1550 nm.

20. The optical fiber according to claim 1, wherein the wire mesh microbend loss $BL_{WM} < 0.01$ dB/km at 1550 nm.

21. The optical fiber according to claim 1, wherein the relative refractive index $\Delta_2$ is constant from the radius $r_1$ to the radius $r_2$.

* * * * *

UNITED STATES PATENT AND TRADEMARK OFFICE
CERTIFICATE OF CORRECTION

| | | |
|---|---|---|
| PATENT NO. | : 11,307,350 B2 | |
| APPLICATION NO. | : 16/944485 | |
| DATED | : April 19, 2022 | |
| INVENTOR(S) | : Ming-Jun Li et al. | |

It is certified that error appears in the above-identified patent and that said Letters Patent is hereby corrected as shown below:

In the Claims

In Column 14, Line 59, in Claim 1, delete "$\Delta_i$;" and insert -- $\Delta_1$; --.

In Column 15, Line 9, in Claim 1, delete "30 $\Delta\%$" and insert -- 30$\Delta\%$ --.

In Column 15, Line 10, in Claim 1, delete "vi)" and insert -- v) --.

In Column 15, Line 12, in Claim 1, delete "vii)" and insert -- vi) --.

In Column 15, Line 15, in Claim 1, delete "$BL_{30}\leq0.005$" and insert -- $BL_{30}\leq0.005$ --.

In Column 15, Line 25, in Claim 3, delete "$\Delta_4\leq0.05\%$." and insert -- $\Delta_4\leq0.05\%$. --.

In Column 15, Line 27, in Claim 4, delete "$\Delta_4\leq0.04\%$." and insert -- $\Delta_4\leq0.04\%$. --.

In Column 15, Line 31, in Claim 6, delete "$BL_{20}\leq0.05$" and insert -- $BL_{20}\leq0.05$ --.

In Column 15, Line 38, in Claim 9, delete "15 $\Delta\%\cdot\mu m^2$." and insert -- 15$\Delta\%\cdot\mu m^2$. --.

In Column 16, Line 5, in Claim 12, delete "$\lambda_{Fc}$" and insert -- $\lambda_{FC}$ --.

In Column 16, Line 7, in Claim 12, delete "$\lambda_{Fc}$" and insert -- $\lambda_{FC}$ --.

In Column 16, Line 30, in Claim 18, delete "fiber DF" and insert -- fiber diameter DF --.

Signed and Sealed this
Twenty-third Day of August, 2022

Katherine Kelly Vidal
*Director of the United States Patent and Trademark Office*